United States Patent [19]

Rozek

[11] Patent Number: 5,213,025

[45] Date of Patent: * May 25, 1993

[54] CONICAL ROD PISTON

[75] Inventor: Roy J. Rozek, Plymouth, Wis.

[73] Assignee: Thomas Industries Inc., Sheboygan, Wis.

[*] Notice: The portion of the term of this patent subsequent to Mar. 3, 2009 has been disclaimed.

[21] Appl. No.: 783,407

[22] Filed: Oct. 28, 1991

Related U.S. Application Data

[63] Continuation-in-part of Ser. No. 470,805, Jan. 26, 1990.

[51] Int. Cl.$^5$ .............................................. F01B 31/00
[52] U.S. Cl. ........................................ 92/109; 92/248; 74/579 E
[58] Field of Search ................ 92/98 R, 99, 109, 172, 92/209, 240; 417/489; 74/587, 579 E, 579 R

[56] References Cited

U.S. PATENT DOCUMENTS

| 76,448 | 4/1868 | Hinds et al. |
|---|---|---|
| 242,366 | 5/1881 | Preston. |
| 551,366 | 12/1895 | Cornwall. |
| 1,254,345 | 11/1918 | Nowosielski. |
| 1,281,196 | 10/1918 | Norrbom. |
| 1,433,987 | 10/1922 | Diebert. |
| 1,449,034 | 3/1923 | Calaway. |
| 1,691,494 | 8/1928 | Noble. |
| 1,748,612 | 2/1930 | Muhlfeld. |
| 1,789,089 | 1/1931 | Tobler. |
| 1,801,517 | 4/1931 | Matthews. |
| 1,839,680 | 1/1932 | Hudson ................... 74/587 |
| 1,981,609 | 11/1934 | Berland ................. 74/579 E |
| 2,388,781 | 11/1945 | Dailey. |
| 2,640,432 | 6/1953 | Chappelle. |
| 2,694,383 | 11/1954 | Larcen. |
| 2,765,776 | 10/1956 | Pyk. |
| 2,985,359 | 5/1961 | Lee et al. ................. 92/240 |
| 3,250,225 | 5/1966 | Taplin. |
| 3,469,504 | 9/1969 | Neighorn. |
| 3,695,150 | 10/1972 | Salzmann. |
| 4,329,915 | 5/1982 | Schulz. |
| 4,454,802 | 6/1984 | Cailliau et al. |
| 4,483,143 | 11/1984 | Corey. |
| 4,693,140 | 9/1987 | Stephan et al. ........... 74/587 |
| 4,848,213 | 7/1989 | Wood et al. ............ 417/489 |
| 4,885,978 | 12/1989 | Caenazzo et al. ......... 92/249 |
| 5,022,312 | 6/1991 | Rozek et al. ............ 92/240 |

FOREIGN PATENT DOCUMENTS

| 2916847 | 4/1980 | Fed. Rep. of Germany. |
|---|---|---|
| 2532994 | 3/1984 | France ....................... 92/240 |

Primary Examiner—Thomas E. Denion
Attorney, Agent, or Firm—Hill, Van Santen, Steadman & Simpson

[57] ABSTRACT

A one-piece piston assembly including a hollow frusto-conical piston is secured to a crankshaft ring via a hollow joint or waist member. Preferably the joint or waist member is frusto-conically shaped as well.

11 Claims, 2 Drawing Sheets

CONICAL ROD PISTON

RELATED APPLICATION DATA

This is a continuation-in-part of U.S. patent application Ser. No. 07/470,805, filed Jan. 26, 1990, now allowed. The disclosure of application Ser. No. 07/470,805 is fully incorporated herein by reference.

BACKGROUND OF THE INVENTION

The present invention generally relates to pistons. More specifically, the invention relates to wobble-type piston and rod assemblies wherein the piston is statically fixed to the piston rod.

Wobble-type piston and rod assemblies are old and well-known in the art. These assemblies are extensively employed in air compressors and diaphragm pumps.

One problem associated with such assemblies is the distribution of stress and strain forces along the connection between the piston and the rod. The rod and piston generally are connected together at a joint having T-shaped cross sections. As the rod reciprocates, it exerts angular stresses at the joint and may cause weakening of the joint, and unacceptable flexing of the assembled parts.

SUMMARY OF THE INVENTION

The present invention provides an improved wobble-type piston and rod assembly. The assembly includes a frusto-conical or infundibularly shaped piston that is capable of withstanding non-axial stress and strain forces induced by reciprocation of the crankshaft ring.

To these ends, in an embodiment, the invention provides a unitary piston assembly comprising a crankshaft ring, a frusto-conically shaped piston, and a frusto-conically shaped waist of joint member connecting the piston to the crankshaft ring.

In an embodiment, the frusto-conically shaped piston is hollow.

In another embodiment, the frusto-conically shaped waist or joint member is hollow.

An advantage of the invention is an improved wobble-type piston and rod assembly that is better able to withstand non-axial stresses and strains exerted at the joint joining the piston to the assembly.

Another advantage of the invention is the provision of a unitary wobble-type piston and rod assembly that is easily formable as a unitary body.

These and other advantages and embodiments will become more apparent below in the detailed description of the presently preferred embodiments and accompanying drawings.

DETAILED DESCRIPTION OF THE PRESENTLY PREFERRED EMBODIMENTS

For the purposes of this description and for the appended claims, it is to be understood that the term conical, when used with reference to a piston, includes both solid conical shapes as well as infundibular (hollow cone or funnel) shapes unless specifically stated otherwise. It can be appreciated that an infundibular shape is preferred because of its lesser weight and/or mass. A frusto-conical shape is a shape defined by a cone intersected by two planes thereby cutting off the actual apex of the cone pad providing a pseudo flat apex, "apex" therefore meaning the top of the narrow end of the frusto-conical shape.

Figure 1:
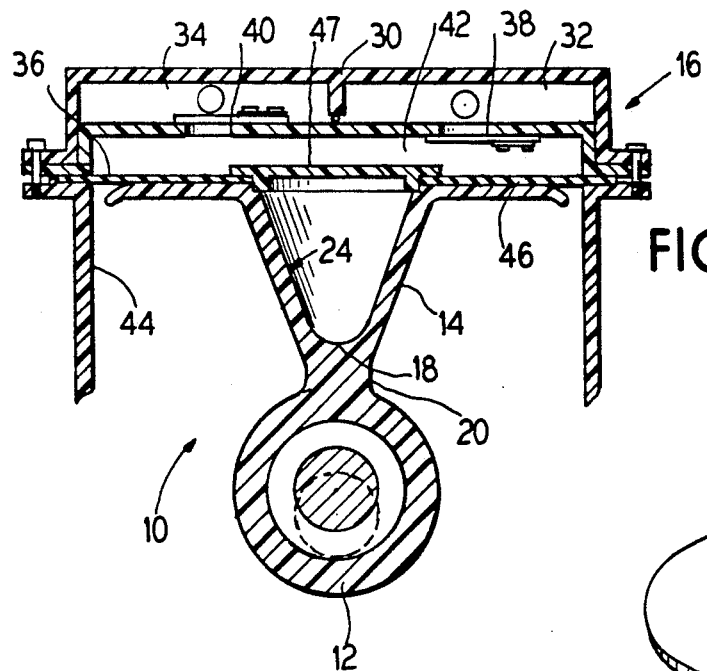
FIG. 1 is a cross-sectional view of an infundibular piston and rod assembly embodying principles of the invention.
Figure 2:
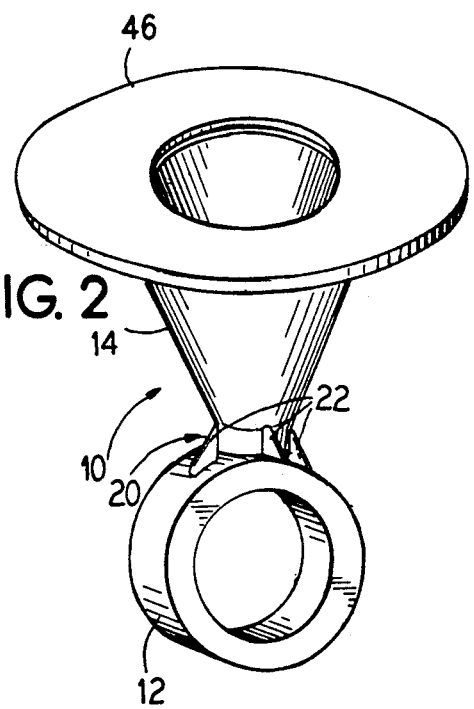
FIG. 2 is a perspective view of a modified version of the infundibular piston and rod assembly of FIG. 1.

A piston and rod assembly 10 embodying principles of the invention is illustrated in FIGS. 1 and 2. The assembly 10 includes a crankshaft ring 12 and a conical combined piston and piston rod 14. In FIG. 1, the assembly 10 is illustrated in conjunction with a diaphragm pump 16.

As illustrated in cross-section in FIG. 1, the conically shaped piston 14 has a V-shape and the apex 18 is joined to the crankshaft ring 12 by means of a joint 20. The point at which the joint 20 meets the apex can also be considered a waist section. The joint 20 comprises a relatively thicker region that may, as illustrated in modified version in FIG. 2, or may not include reinforcing ribs 22. In either event, the joint 20 has a substantially conical profile that flares outwardly from the apex to the ring 12.

As illustrated in FIG. 1, the piston rod assembly 10 is adapted for use in a diaphragm pump 16 that includes a manifold 30 having intake and output chamber 32 and 34, respectively. A diaphragm 36 is positioned below reed valve openings 38 and 40 to create a pumping chamber 42. The diaphragm 36 is appropriately attached to a cylinder 44 so as to seal the pumping chamber 42.

The piston 14 includes a radial flange 46 that provides support to the underside of the diaphragm 36. It can be appreciated that reciprocation of the piston will cause flexing of the diaphragm 36 which in turn provides the requisite pumping action.

The diaphragm 36 is secured to piston 14 by means of a retainer plate 47. This plate may be secured to piston 14 by means of ultrasonic welding of other conventional means, i.e., threaded, screwed, bonded, etc.

It can also be appreciated that because the piston 14 is a wobble type piston and does not reciprocate along a linear path, as the piston 14 is caused to reciprocate, stress and strain forces are exerted at angles to the axis of the conical piston 14 as well as along the axis of the cone. These forces vary as the piston 14 is caused to tilt back and forth as it reciprocates in wobble fashion.

Due to the conical shape of the piston 14, the wall 24 of the piston 14 is capable of reacting to the angular forces. The slope of the wall 24 aligns the wall 24 with some of these angular forces.

Figure 3:
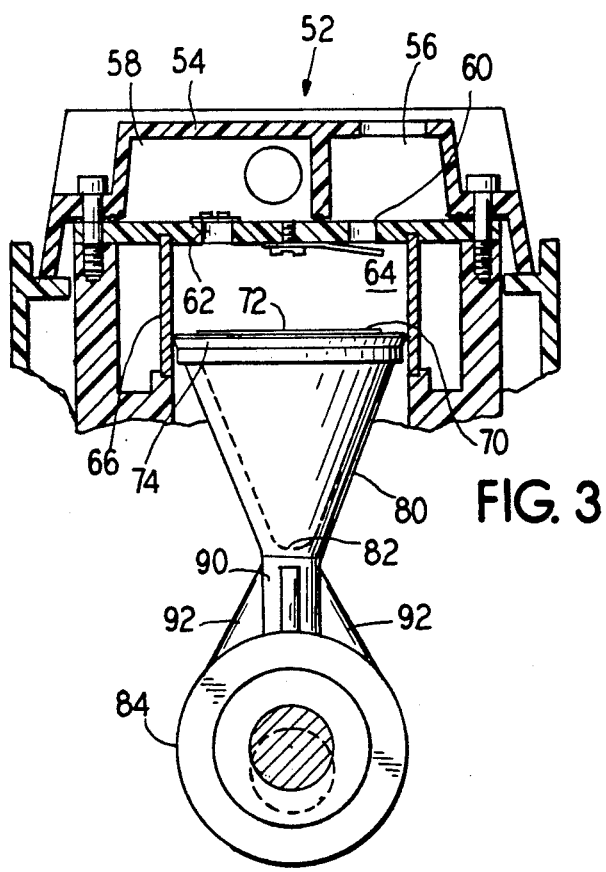
FIG. 3 is a cross-sectional view of a conical rod and piston assembly embodying further principles of the invention.

In FIG. 3, there is illustrated another piston and rod assembly 50 that is constructed in accordance with the invention. The assembly 50 is shown employed in a typical air compressor 52.

The air compressor 52 includes a manifold 54 having an air inlet chamber 56 and an air outlet chamber 58. Reed valve openings 60 and 62 provide fluid communication between these chambers and a compression chamber 64. A cylinder 66 attached to a base 68 of the manifold 52 provides the compression chamber 64.

A piston head 70 of the assembly 50 is received within the cylinder 66. The piston head 70 is typical of most wobble-type pistons in that it includes a working surface 72 and a cup seal 74 about the periphery of the working surface 72.

As illustrated, a piston 80 of the assembly 50 is conically shaped and has its apex 82 attached to a crank ring 84. In contrast to the assembly 10, in the assembly 50, the conical piston 80 is attached to the ring 84 by means of a flattened beam 90 that serves as a piston rod. The flattened beam includes two flared ribs 92 that flare outwardly within the plane of the beam 90.

As the piston and the rod assembly 50 is caused to reciprocate, the stresses and strains exerted on the joint between the piston 80 and the flattened beam 90 with flared ribs 92 are exerted along the ribs and the wall of the piston 80 at an angle to the axis of the piston. This angular exertion of forces is less stressful on the joint than if the point were T-shaped in cross-section and therefore, the joint is less likely to fail.

It can be appreciated that in all of the embodiments illustrated in FIGS. 1-3, a joint or waist section in cross-section defines an x-shape in profile. The outer wall of the piston comprises the upper portion of the x-shape. The outer edges of the flared ribs lying within a plane of the crankshaft ring comprise the lower portion of the x-shape. It is this x-shape that provides triangulated action and counteraction to relieve the joint from failure due to the effects of the stress and strain forces.

Figure 4:
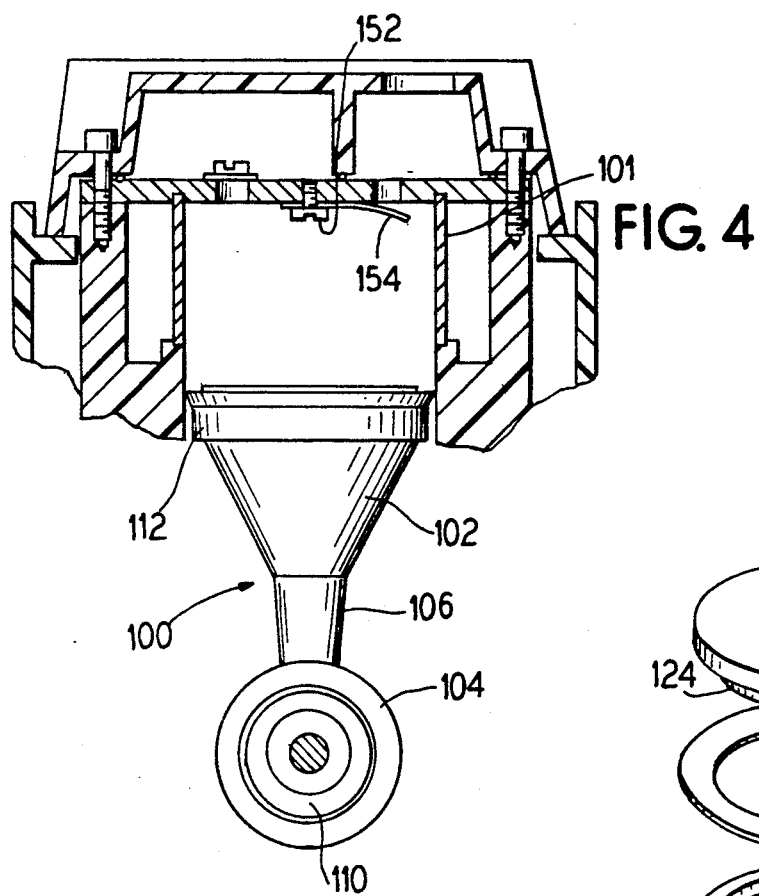
FIG. 4 is a sectional view of a manifold with a downwardly extending cylinder and an elevational view of a conical rod piston assembly embodying principles of the invention.
Figure 5:
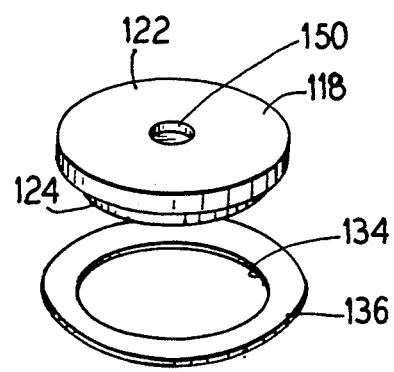
FIG. 5 is an exploded view of the piston assembly of FIG. 4.
Figure 6:
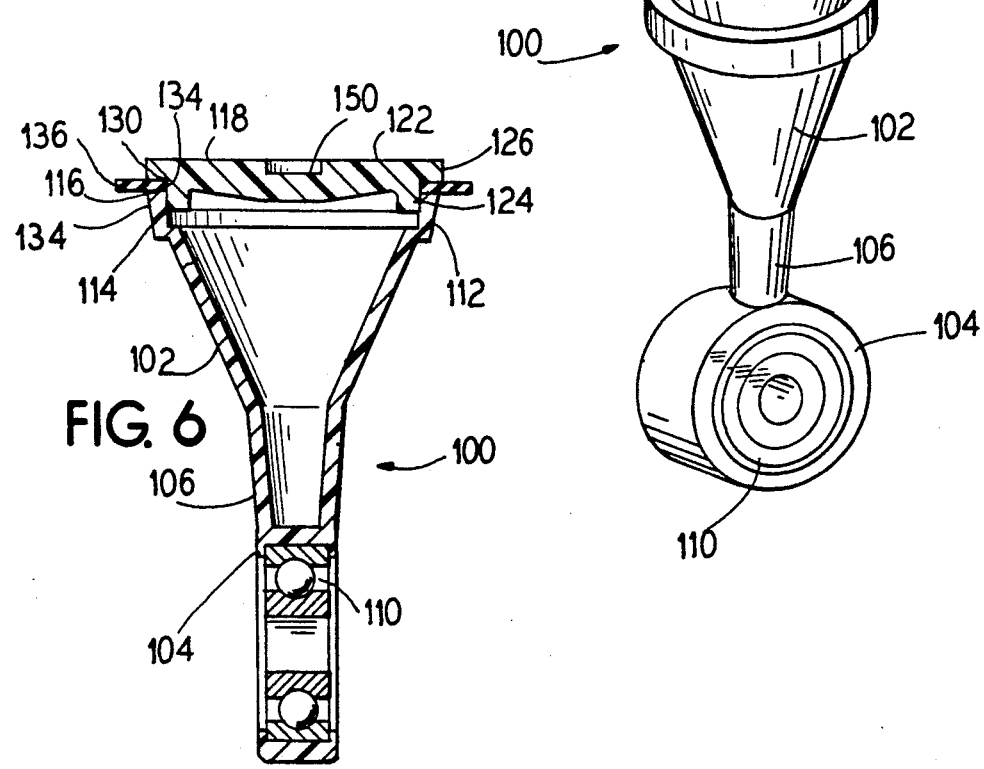
FIG. 6 is a sectional view of the piston assembly of FIG. 4 generally taken along the line VI—VI.

In FIGS. 4-6, a particular conical rod piston assembly is illustrated wherein a particular waist section or joint member comprises a hollow frusto-conical member.

As illustrated, in this particular embodiment, a conical rod piston assembly 100 includes a frusto-conical piston 102 secured to a crankshaft ring 104 by means of a frusto-conical joint member or waist section 106. The piston head 102 and waist section 106 preferably are hollow.

As further illustrated, the crankshaft ring 104 is constructed to be molded about a bearing member 110 during formation of the crankshaft ring. The piston 102, crankshaft ring 104, and waist section 106 are simultaneously molded in a unitary construction.

As also illustrated, the top end of the piston 102 is defined by an annular wall 112. The annular wall 112 is constructed to include an interior circumferential ledge or shelf 114 and a circular bead or rib 116 formed at the very top surface or edge of the wall 112. The ledge or shelf 114 is used to support a cap member 118 secured to the top end of the piston 102 while the bead 116 is used during ultrasonic welding of the cap member 118 to the top end, as explained below.

In the embodiment of FIGS. 4-6, the cap member 118 forms part of the piston assembly 100 and provides the piston working surface used to compress fluid in a surrounding cylinder 101. To this end, the cap member 118 is secured to the piston 102, preferably ultrasonically so that the resulting assembly 100 is of a unitary construction.

Due to the nature of ultrasonic welding, the cap member 118 and piston 102 will fuse together at the top end of the piston 102 thereby forming a continuous member. To ensure good fusing between the cap member 118 and the piston 102, the cap member 118 is constructed to include a disc-like surface 122 and a concentric downwardly depending annular wall 124. The wall 124 rests on the ledge or shelf 114 when the cap member 118 is placed on the top end of the piston 102, while the disc surface 122 extends outwardly to form a flange whose edge 126 preferably is flush with the outside surface 128 of the piston 102.

Additionally, as illustrated best in FIG. 6, a circumferential recess 130 is provided in the underside of the disc surface 122 and adjacent the outside 132 of the downwardly depending annular wall 124. This recess 130 serves to grasp an inner edge 134 of an annular seal 136 secured between the cap member 118 and the piston 102 during welding of the cap member 118 to the piston 102. The bead 116 also serves to dig into the seal thereby to further secure the seal 136 in the piston assembly.

An additional feature of the cap member 118 is illustrated in FIGS. 5 and 6. As illustrated, the cap member preferably includes a central circular recess or bore 150 formed in the upper side thereof. The recess or bore 150 is provided to register with a screw 152 used to secure a leaf valve 154 on the underside of the manifold. It can be appreciated that the recess 150 allows the piston 102 to extend closer to the manifold without fear of hitting the screw 152 because the screw 152 merely will be captured within the recess 150 and thus never hit by the piston 102.

The use of the hollow piston 102 and hollow waist section 106 reduces the weight of the piston and makes the piston assembly 100 easier to assemble. Further, the frusto-conical shape of the piston 102 and waist section 106 gives the piston assembly great strength to combat the various forces encountered during wobble action.

While preferred embodiments have been shown, modifications and changes may become apparent to those skilled in the art which shall fall within the spirit and scope of the invention. It is intended that such modifications and changes be covered by the attached claims.

What is claimed is:

1. A plastic piston assembly, comprising:
   (a) a plastic annular crankshaft ring;
   (b) a plastic hollow frusto-conical piston body having an apex and a piston head end remote from the apex;
   (c) a plastic hollow joint member extending between and joining said apex to said crankshaft ring, the joint member interconnecting an outer wall of the crankshaft ring and the apex of the frusto-conical piston body;
   (d) a plastic working surface member secured to the piston head end of the piston body remote from the apex; and
   (e) an annular seal secured between the working surface member and the piston head end of the piston body.

2. The piston assembly of claim 1, wherein said piston includes an annular rib at a top thereof used to secure the seal in the assembly.

3. The piston assembly of claim 1, wherein said piston includes a working surface closing said frusto-conical piston body at its larger diameter end, and the annular seal extends about a periphery of said working surface.

4. The piston assembly of claim 1, wherein said joint member is frusto-conically shaped.

5. A unitary piston assembly, comprising:
 (a) a crankshaft ring molded about a bearing;
 (b) a piston formed by a frusto-conical body having an apex; and
 (c) a hollow frusto-conical joint member that connects said apex of said piston body to said crankshaft ring.

6. The piston assembly of claim 5, being made of plastic.

7. A pump, comprising:
 (a) a pump manifold;
 (b) a cylinder operatively attached to said manifold; and
 (c) a unitary piston assembly cooperating with said cylinder, said piston assembly including a hollow frusto-conically shaped piston body having an apex extending in converging fashion from said cylinder, a crankshaft ring attached to said apex and being molded about a bearing, and a hollow joint member extending between said piston body and said ring, said joint member extending between said apex and said crankshaft ring.

8. The pump of claim 7, wherein said piston includes a cap member forming a working surface of said piston.

9. The pump of claim 7, wherein said piston body, joint member, cap member, and crankshaft ring are formed of plastic and unitarily joined together.

10. The pump of claim 9, wherein said piston assembly includes an annular seal secured between said cap member and said piston body.

11. The pump of claim 7, wherein said joint member is frusto-conically shaped and extends in converging fashion from said apex to said crankshaft ring.

* * * * *